E. S. HOYT.
AUTOMATIC WATER HEATER.
APPLICATION FILED AUG. 27, 1914.
1,310,160. Patented July 15, 1919.
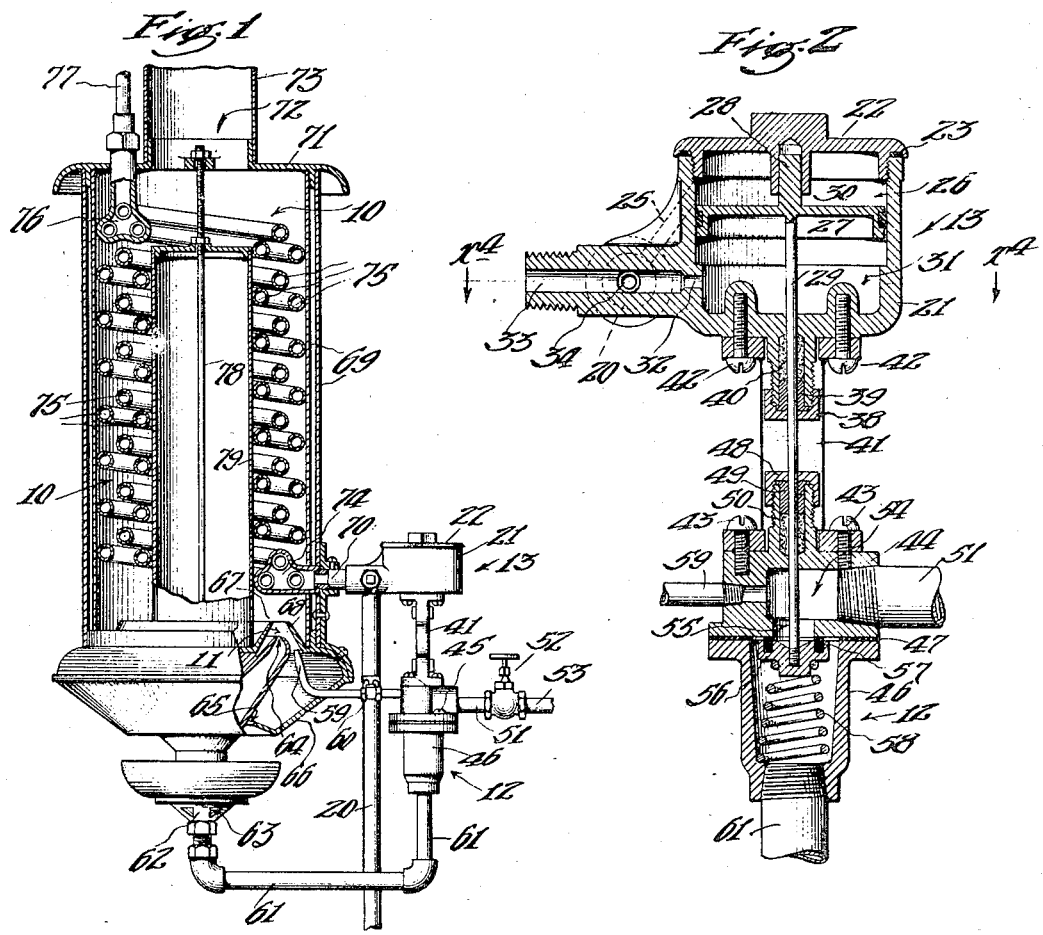
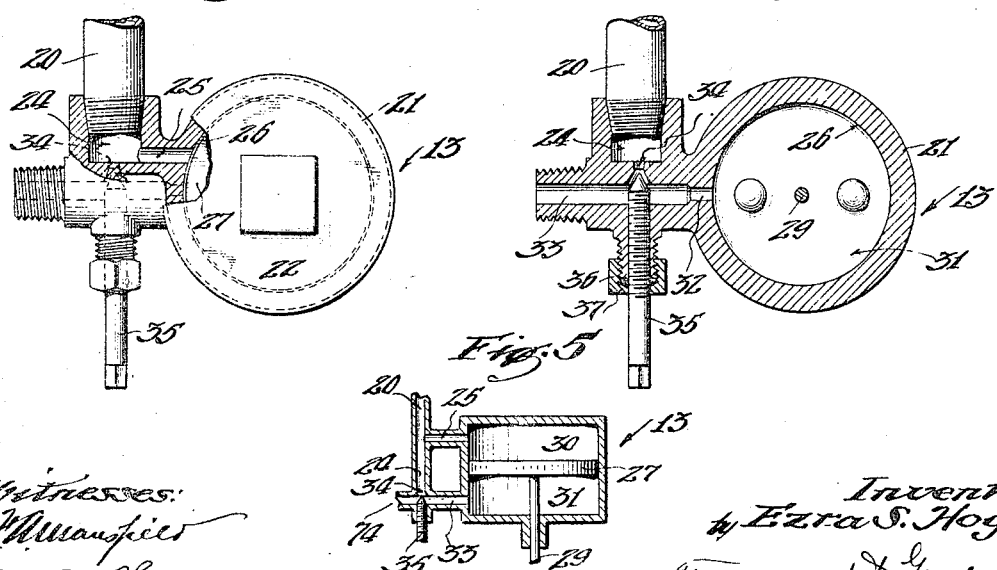
Inventor,
Ezra S. Hoyt;
Townsend & Graham,
his attys.

UNITED STATES PATENT OFFICE.

EZRA S. HOYT, OF LOS ANGELES, CALIFORNIA.

AUTOMATIC WATER-HEATER.

1,310,160.  Specification of Letters Patent.  Patented July 15, 1919.

Application filed August 27, 1914. Serial No. 858,954.

*To all whom it may concern:*

Be it known that I, EZRA S. HOYT, a citizen of the United States of America, residing at Los Angeles, in the county of Los Angeles and State of California, have invented a new and useful Automatic Water-Heater, of which the following is a specification.

The invention relates to water heaters of the automatic type. In such heaters a heating coil is provided through which water is circulated and against which heated gases are directed, the quantity of heated gases supplied being regulated by the amount of water passing through the heater thus giving an approximately constant temperature to such water regardless of the amount consumed. There have already been devised various heaters of this type. The particular feature which has made such automatic heaters possible, and one feature in which the various types of heaters essentially differ is in the structure of the regulating or control means whereby the flow of gas is controlled to give an even temperature to the issuing water with a variable flow of such water. My invention more particularly relates to such control or regulating means.

My invention provides a heater with a regulator which will start or stop the flow of gases as the flow of water through the heater is started or stopped.

Such heaters find their greatest market for domestic purposes and they are operated without intelligent supervision. It is necessary in such a heater that excessive pressures be guarded against. The principal object of the invention is to provide a heater in which the pressure can never rise materially above the pressure of the water supply.

In the common forms of automatic water heaters employing a drop in water pressure as the gas controlling means, any considerable flow of water through the heater opens, or holds open, the gas valve so that fuel is burned and the water is heated. If faucets are left partly open, or there is a small leak due to defective plumbing, the heater continuously uses gas, and in such heaters it is common practice to supply an auxiliary thermostat to take care of this difficulty. In my invention gas is consumed only when water is flowing freely through the heater, the supply of gas being shut off whenever this flow is reduced to a value equal to approximately half the capacity of the heater.

Other objects and advantages will be evident to one skilled in the art from the annexed drawing and the following specification.

In this drawing which is for illustrative purposes only:

Figure 1 is an elevation of a water heater embodying the invention in which a portion of the heater is shown in section on an axial plane.

Fig. 2 is a section on a vertical axial plane through the control and gas valve.

Fig. 3 is an elevation of the parts shown in Fig. 2, a distorted section being shown to better illustrate the invention.

Fig. 4 is a section on the line $x^4$—$x^4$ of Fig. 2.

Fig. 5 is a diagrammatic view of the control valve.

10 is a heating coil which is supplied with heated gases from a burner 11. The supply of gas to this burner is controlled by a gas valve 12 which in turn is governed by a control valve 13. Water is supplied through a water inlet pipe 20 which is threaded into a control valve casing 21, a cover 22 being threaded thereon and provided with packing 23 to make a tight joint therewith. The water inlet pipe 20 is in open communication with a water inlet chamber 24. This water inlet chamber communicates through a passage 25 with a cylinder 26 formed in the control valve casing 21. Sliding freely in the cylinder 26 is a piston 27 having a projection 28 which extends into an opening in the cap 22 and having a piston rod 29 which extends downwardly through the bottom of the control valve casing 21. The piston 27 divides the cylinder 26 into an upper pressure chamber 30 and a lower pressure chamber 31, the upper pressure chamber 30 being always in open communication with the source of water supply through the opening 25 and the water inlet pipe 20. The lower pressure chamber 31 is always in open communication with the heating coil 10 through an opening 32 formed in the side of the cylinder and an opening 33 formed in the arm of the control valve casing 21, the opening 33 being connected to and in open communication with the heating coil 10 as will hereinafter be described. Between the water inlet chamber 24 and the opening 33 an opening 34 is provided extending substantially at right angles thereto, this opening being adapted to be partly closed by a valve stem 35 which is threaded into the control valve body 21 and extends through the side thereof across the opening 33 in the arm and has a tapering valve adapted to partly close the opening 34 from the water inlet chamber 24, as illustrated in Figs. 3 and 4. A gland 36 and packing 37 make a tight closure between the valve stem 35 and the control valve casing 21. The valve stem 35 and its relative parts form a water adjusting valve and provide a throttled connection between the coil 10 and the water inlet pipe 20, and between the upper pressure chamber 30 and the lower pressure chamber 31.

The valve stem 29 extends downwardly through a gland 38 which is threaded on the control valve casing 21 and which presses downwardly upon a follower 39 which compresses packing 40 thus making a tight closure around the piston rod 29 where it passes through the control valve casing 21. A bracket 41 is secured to the bottom of the control valve casing 21 by means of screws 42 and is secured by means of screws 43 to a gas valve casing 44. Secured to the gas valve casing 44 by means of screws 45 is a gas cap 46, packing 47 being provided for making the closure between the members 44 and 46 a tight one. A gland 48 is threaded to the gas valve casing 44 and presses down upon a follower 49 which compresses packing 50, thus making a tight closure around the piston rod 29 where it passes into the gas valve casing 44. The gas valve casing 44 is tapped at one side for the reception of a gas inlet pipe 51 which is connected through a valve 52 with a gas supply pipe 53 which is connected to the source of gas supply. The gas pipe 51 is in open communication with a gas chamber 54 formed in the gas valve casing 44, and an opening 55 is provided between the chamber 54 and the interior of the cap 46. This opening is normally closed by a valve 56 which is provided with packing 57 and which is held in place by a compression spring 58. The valve 56 is rigidly fastened to the piston rod 29 and is operated thereby.

A pilot tube 59 is also in open communication with the chamber 54 and extends into the interior of the heater being provided with a valve 60 to regulate the amount of flame therein. A pipe 61 is threaded into the bottom of the cap 12 and is in open communication with a mixing chamber 62 of the burner 11 which is provided with air inlets 63. The burner 11 has the form shown in Fig. 1 and is provided with a plurality of small holes 64 through which the mixed air and gas escape and are ignited by the flame from the pilot tube 60. An auxiliary supply of air is also provided for the burner 11, this air being taken in through openings 65 formed in a base 66 and passing upwardly to the burner 11, being directed against the flame by deflectors 67 and 68 formed on the base 66.

An outer shell 69, preferably formed of two thicknesses of metal, is provided secured to the base 66 and extending up and being tapped at 70 for the reception of the arm of the water control valve casing 21. A top 71 is secured to the upper end of the outer shell 69, this top being provided with a flue 72 in open communication with the vent pipe 73. A cold water header 74 is provided secured to the arm of the water control valve casing 21 and having its interior in open communication with the opening 33 thereof. Three parallel heating coils 75 are provided, these heating coils being arranged as shown in Fig. 1 and being in open communication at their lower end with the cold water header 74 and in open communication at their upper end with the hot water header 76 which is connected to the hot water outlet pipe 77. A central rod 78 tends to hold the previously described parts together and an inner deflecting tube 79 is placed inside the coil 75.

The method of operation of the invention is as follows: Water is supplied to the upper pressure chamber 30 through the pipe 20, the water inlet chamber 24 and the opening 25. The pressure in the upper pressure chamber 30 is therefore that of the supply main less a very small amount due to the drop in the service pipes leading thereto. This drop is however very small and may be negligible. The valve stem 35 is set to partly close the opening 34 so that the maximum amount of water which can flow therethrough does not exceed the amount of water which the heater can successfully heat with the gas valve fully opened. When no water is being taken through the outlet pipe 77 the spring 58 holds the valve 56 closed and shuts off the supply of gas to the burner 11. The pilot tube 59 is however in open communication with the gas inlet pipe 51 and the pilot flame is regulated by means of the valve 60 to provide a continuously burning pilot flame adjacent to the burner 11. When water is withdrawn through the water outlet pipe 77 its place in the coils 75 is supplied by water from the water inlet pipe 20 passing through the opening 34 which is partly closed or throttled by the valve stem 35. The flow of water is regulated by this valve to such a degree that there is a considerable drop in pressure through this valve and the pressure in the chamber 31 is considerably lower being only the pressure necessary to carry the water through the heater to the open faucet. The drop in pressure between the opening 33 and the water inlet chamber 24 is proportional to the amount of water flowing through the opening 34 with a given setting of the valve stem 35 and this drop in pressure may be increased with a given flow of water by further closing the opening 34 by means of the valve stem 35. Since the pressure in the opening 33 is less than the pressure in the water inlet chamber 24 it is evident that the pressure in the upper pressure chamber 30 is greater than the pressure in the lower pressure chamber 31 since the pressure chamber 30 is in open communication with the water inlet chamber 24, and the lower pressure chamber 31 is in open communication with the opening 33. With an excess of pressure in the upper pressure chamber 30 over the pressure in the lower pressure chamber 31 it is evident that there will exist a pressure on the top of the piston 27 tending to force it downwardly and that this pressure will be transmitted through the piston rod 29 to the valve 56. This pressure is resisted by the spring 58, the resistance of the spring 58 increasing rapidly as the valve 56 is pushed downwardly. It is evident therefore with an excess pressure acting upon the piston 27 that the valve 56 is pushed downwardly from its seat. As the valve 56 is lifted from its seat gas is allowed to flow through the opening 55 into the interior of the cap 46 and through the pipe 61 into the mixing chamber 62 where it is mixed with air admitted through the opening 63, the combustible mixture passing up to the burner 11 and emerging through the series of small holes 64 formed therein. The combustible mixture is ignited by the pilot flame, a ring of burning gas resulting. Air is supplied to the sides of this burning ring through the opening 65 and is forced against the side of the flame by means of the deflectors 67 and 68 with the result that there is always an excess of oxygen on the outer surface of the flame which results in a very complete and perfect combustion of both the carbon and the hydrogen in the flame. The heated gases from the burner 11 pass upwardly between the deflecting tubs 79 and the outer shell 69. It will be noted that the arrangement of the heating coils 75 is such that this flame takes a zigzag path and contacts very thoroughly with the outer surface of the heating coils 75. The burned gases are withdrawn through the vent pipe 76 passing into this vent pipe through the flue 72. Whenever the flow of water through the pipe 77 is materially obstructed and the flow of water through the opening 34 is materially cut down the pressures in the chambers 30 and 31 are practically equalized. There is therefore only a slight unbalanced pressure on the piston 27 which the tension of the spring 58 overcomes and closes the valve 56, the supply of gas passing to the burner thereby being shut off. This shutting off of the gas is accomplished if there is a considerable flow through the pipe 77. In practice the spring 58 is made sufficiently strong to close the valve 57 even with half the capacity of the heater flowing through the pipe 77. This results in shutting off the gas even if there is a considerable leakage in the supply faucet.

There are at the present time in the market water heaters having regulators in which the water pressure is allowed to act on the top of a piston for the purpose of opening the gas valve. Such heaters commonly connect the water supply directly on top of the piston and provide a port in the cylinder walls which is uncovered by the piston and through which the heating coils are supplied. In such a heater it is necessary for the piston to have considerable travel before any water whatever is supplied to the heating coils. My invention should not be confused with heaters of this type as in my invention the water supply is always in communication with the heating coils, a free passage being provided through the opening 34. This opening is partly throttled but is never entirely closed in practice. In case the valve 56 fails to work for any reason and excess heat is supplied to the heating coils 75 there is never any possibility in my invention of the pressure rising materially above that of the source of supply as this pressure can relieve itself through the opening 34.

I claim as my invention:

An automatic water heater comprising a water control valve provided with a valve-casing constructed with a cylinder, having a water inlet chamber, a passage between the water inlet chamber and the upper part of the cylinder, an arm on the cylinder having an opening, an opening in the lower part of the cylinder, connecting with the opening in the arm and an opening between the water inlet chamber and the opening in the arm extending substantially at right angles thereto, a piston in the cylinder dividing it into an upper pressure chamber and a lower pressure chamber, a valve stem extending across the opening in the arm and formed with a tapering valve adapted to partly close the opening from the water inlet chamber, a gas valve casing constructed with a gas chamber, and an opening from the gas chamber, a valve for said opening, means whereby the water control valve casing is connected with the gas valve casing, a piston rod extending from the piston and connected to the gas valve, and a spring for seating the valve against the opening from the gas chamber.

In testimony whereof, I have hereunto set my hand at Los Angeles, California, this 19th day of August, 1914.

EZRA S. HOYT.

In presence of—
  FORCE W. HARRIS,
  FRED A. MANSFIELD.